United States Patent
Tyan et al.

(10) Patent No.: US 6,473,517 B1
(45) Date of Patent: Oct. 29, 2002

(54) CHARACTER SEGMENTATION METHOD FOR VEHICLE LICENSE PLATE RECOGNITION

(75) Inventors: Jenn-Kwei Tyan, Princeton, NJ (US); Claus Neubauer, Monmouth Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/396,952

(22) Filed: Sep. 15, 1999

(51) Int. Cl.[7] .................................................. G06K 9/00
(52) U.S. Cl. ....................................... 382/105; 382/105
(58) Field of Search ................................. 382/105, 104, 382/205, 177, 278, 159, 173, 176, 291, 204, 218, 178; 340/907, 933, 10.1; 704/251; 375/240.1, 240.24, 240.02; 345/810, 840, 520, 427

(56) References Cited

U.S. PATENT DOCUMENTS 4,654,873 A * 3/1987 Fujisawa et al. ............ 382/178
5,651,075 A * 7/1997 Frazier et al. ............... 382/105
5,799,276 A * 8/1998 Komissarchik et al. ..... 704/251
5,809,161 A * 9/1998 Auty et al. .................. 382/104
6,339,651 B1 * 1/2002 Tian et al. ................... 382/105

* cited by examiner

Primary Examiner—Leo Boudreau
Assistant Examiner—Seyed Azarian
(74) Attorney, Agent, or Firm—Donald B. Paschburg

(57) ABSTRACT

A method for segmenting and recognizing license plates, in accordance with the present invention includes capturing an image of a license plate and preprocessing the image to prepare the image for segmentation and recognition. Forward splitting regions of the license plate image into suspected characters regions, the suspected character regions are recognized in the license plate image and a confidence score is provided based on a probability of a correct match. If the suspected characters have a confidence score below a threshold value, backward merging is employed which merges adjacent suspected character regions. The backward merged suspected character regions in the license plate are recognized. If the backward merged suspected character regions have a confidence score below the threshold value, the backward merging and recognizing steps are repeated to improve the confidence score.

27 Claims, 7 Drawing Sheets

CHARACTER SEGMENTATION METHOD FOR VEHICLE LICENSE PLATE RECOGNITION

BACKGROUND

1. Technical Field

This disclosure relates to character recognition and more particularly, to a method for segmenting characters in a license plate for recognition.

2. Description of the Related Art

Several computer vision-based prior art systems for reading a license plate number have been developed in the past. These systems typically consist of three main modules: plate localization, character segmentation and character recognition. Within a serial fashion scheme, character segmentation is needed to perform character recognition which fully relies on isolated characters. Incorrectly segmented characters are not likely to be correctly recognized. In fact, most of the recognition errors in the conventional open-loop systems are not due to missing recognition power, but to segmentation errors on different image levels. To develop a robust character segmentation is difficult for license plate recognition. The reasons are mainly that the limited resolution of plate characters together with dirt, scratches, shadows and skew etc., usually degrades performance of segmentation. In addition, outdoor environment under great variations of illumination changes could make the development of a reliable segmentation scheme very complicated.

Character segmentation based on the pixel projection is widely used in conventional optical character recognition (OCR) systems. In general, the conventional systems perform well for most machine-printed text recognition tasks. The advantage of such systems is the gains in speed of execution. If the characters in license plate are in perfect condition, that is, they are sufficiently separated or unbroken, character segmentation may be accomplished directly from the projection function. However, clean and uniformly illuminated license plate images are not usually available in real-life scenarios.

Therefore, a need exists for a robust segmentation method for segmenting characters under a plurality of different illumination and environmental conditions.

SUMMARY OF THE INVENTION

A method for segmenting and recognizing license plates, in accordance with the present invention, which may be implemented using a program storage device readable by machine, tangibly embodying a program of instructions executable by the machine to perform the method steps, includes capturing an image of a license plate and preprocessing the image to prepare the image for segmentation and recognition. The image is forward split into suspected characters regions of the license plate image. Suspected character regions in the license plate image are recognized and provided with a confidence score based on a probability of a correct match. If the suspected characters have a confidence score below a threshold value, backward merging adjacent suspected character regions is performed. The backward merged suspected character regions in the license plate are recognized, and if the backward merged suspected character regions have a confidence score below the threshold value, the backward merging and recognizing steps are repeated.

In alternate embodiments, which may employ the program storage device, the step of recognizing suspected character regions in the license plate image may include determining regions with a confidence score below a threshold, and the step of forward splitting regions may include the step of segmenting touching or overlapping characters in adjacent suspected character regions by employing a discrimination function based on contour projections of the characters. The step of segmenting touching or overlapping characters may be recursively applied to achieve the threshold value of a confidence score. The step of recognizing suspected character regions in the license plate image and providing a confidence score based on a probability of a correct match may include the step of recognizing characters in the license plate image by employing at least one of a neural network and template matching.

In still other embodiments, the step of recognizing the backward merged suspected character regions in the license plate may include the step of recognizing characters in the license plate image by employing at least one of a neural network and template matching. The step of preprocessing the image to prepare the image for segmentation and recognition may include the steps of detecting pretilt in the license plate image by detecting edges and selecting feature points to determine a projection array on the edges, selecting the projection array having a highest cost to determine an angle of rotation and correcting the license plate image in accordance with the angle of rotation. The step of preprocessing the image to prepare the image for segmentation and recognition may include the steps of refining a position of the license plate by determining a height of characters on the license plate image by employing a projection function, computing a spatial variance to determine a center position of the characters, employing the center position and the height of the characters to reduce a size of a region of interest by detecting edges of a plate border and computing a length of the edges to identify the region of interest. The step of preprocessing the image to prepare the image for segmentation and recognition may include the steps of providing a projection profile of pixel intensities across vertical lines of pixels in the image, filtering the projection profile and identifying locations of characters in the image depicted by area below a threshold value in the filtered projection profile. The step of outputting recognized characters of the license plate image is preferably performed. The step of comparing recognized characters and character blocks to predetermined license plate codes and conventions to check accuracy of recognition may be included.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention relates to character recognition and more particularly, to a robust method for segmenting characters in a license plate for recognition. Automatic recognition of vehicle license plates is particularly useful for high accuracy applications in which car identification is performed. Vehicle license plate recognition is beneficial in traffic monitoring and control as well as in maintaining records of through traffic, for example at a parking lot gate. To enhance the performance of character segmentation, the present invention performs image preprocessing to deal with plate skew and to refine plate position after the image is rotated. This is needed to prepare the data for later processing. Vehicle images are degraded due to broken and touching characters. Failure to recognize and segment these characters results in the segmentation process being responsible for the major errors experienced by recognition systems.

The present invention provides a method for more accurately separating touching characters and merging broken characters. An efficient and powerful discrimination function is provided by the present invention for identifying touching characters based on a differential analysis of character contour distance. The present invention is also separates kerned characters that are overlapped with neighboring characters.

Instead of an open-loop operation scheme, the present invention employs a conditionally recursive segmentation method that-is capable of extracting individual characters, for example, from a license plate, with accuracy and efficiency. The methods of the invention are inter-related between segmentation and recognition to check if the plate characters have been correctly segmented based on the result of the character recognition. In one embodiment, for a forward split procedure, a discrimination function is selectively applied to suspicious character regions that determine the best breaking point if characters are touched or overlapped. Next, a backward merge procedure is followed to recover false segmentation due to broken characters. Both split and merge procedures employ feedback of classification from the character recognition step.

A classifier including template matching and neural networks is realized by the invention. This advantageously increases recognition power and provides better segmentation results. The present invention further includes rule-based features and measurement features in the segmentation of the plate. This includes registration regulations and codes which set forth plate appearances (e.g., city/locale codes), alphanumeric fields and character font size. Note that the characters recognized by the present invention in the license plates may be varied and the characters may not be evenly fixed.

Figure 1:
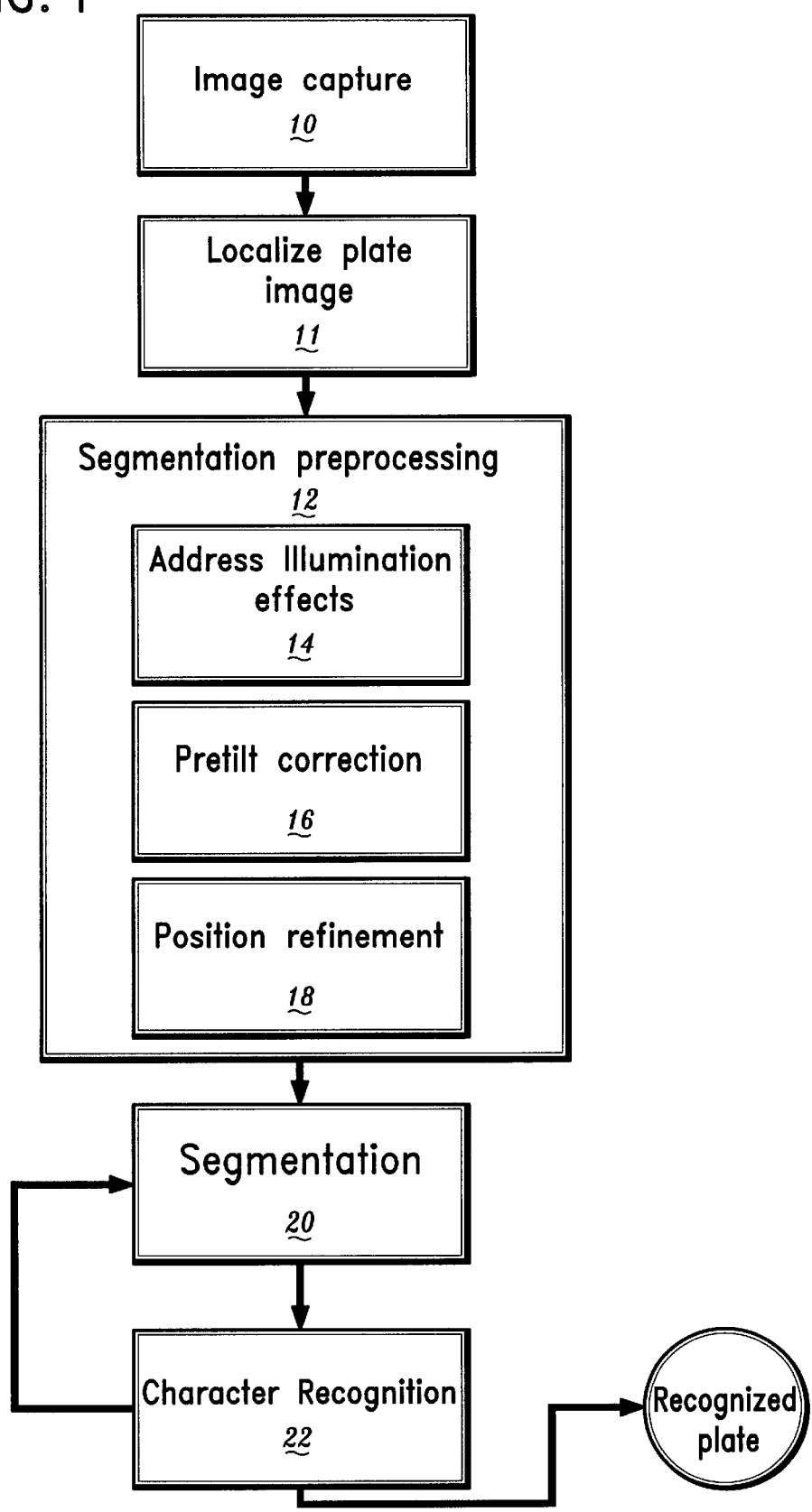
FIG. 1 is a flow diagram showing a license plate recognition method in accordance with the present invention.
Figure 7:
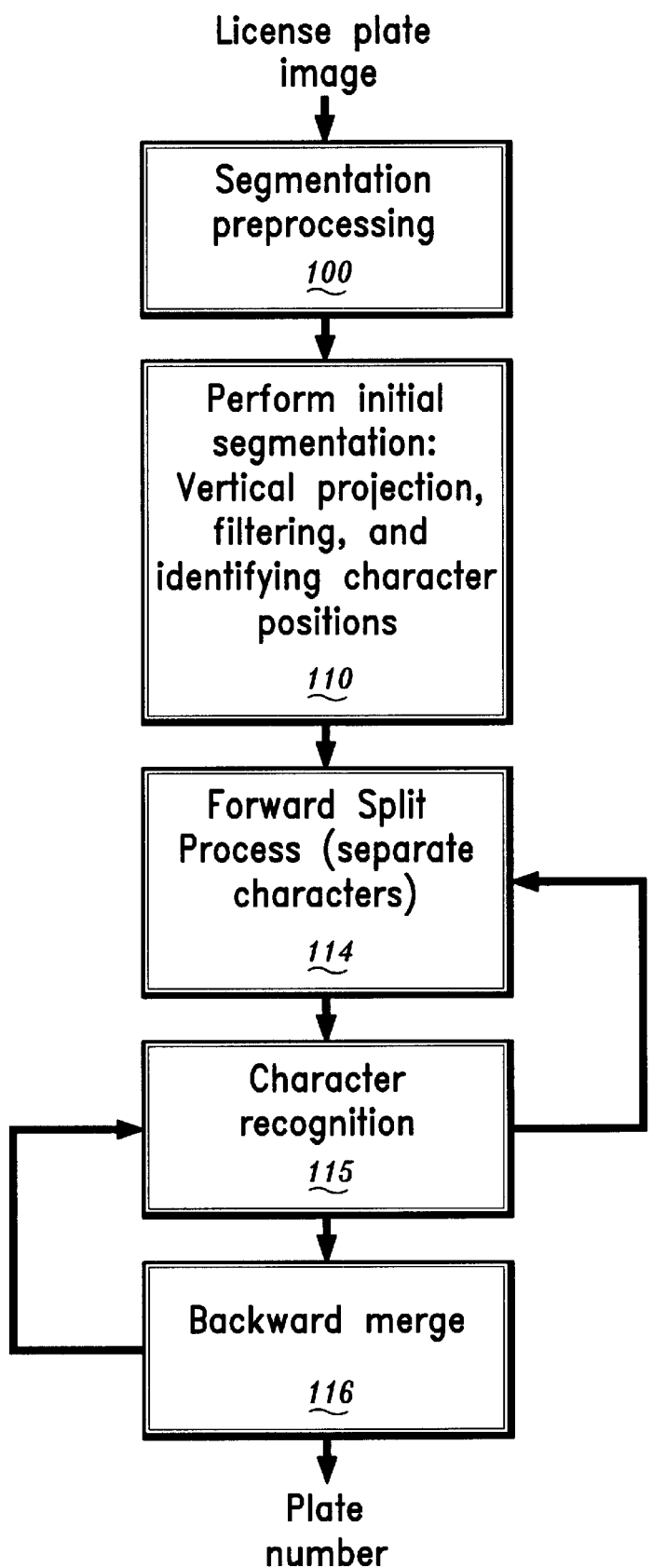
FIG. 7 is a flow diagram of a recognition based segmentation method in accordance with the present invention.

It should be understood that the elements shown in FIGS. 1 and 7 may be implemented in various forms of hardware, software or combinations thereof. Preferably, these elements are implemented in software on one or more appropriately programmed general purpose digital processing having a processor and memory and input/output interfaces.

Referring now in specific detail to the drawings in which like reference numerals identify similar or identical elements throughout the several views, and initially to FIG. 1, a block/flow diagram is shown in accordance with the present invention. In block 10, an image is captured or acquired, preferably by a digital camera having a processor and a memory as described in commonly assigned U.S. application Ser. No. (TBD), entitled "LICENSE PLATE RECOGNITION WITH AN INTELLIGENT CAMERA", Atty Docket: 98E9327 US (8706-337) filed concurrently herewith and incorporated herein by reference. In block 11, the image is localized to focus on an area of interest (e.g., a license plate). This may be referred to as coarse localization.

In block 12, image or segmentation preprocessing is performed to improve the recognition rate. Without proper preprocessing, the subsequent segmentation and recognition steps may be difficult. Several preprocessing methods for neural network recognition, for example, may include image and/or character equalization. In block 14, effects such as lighting effects (e.g., illumination, distance and/or orientation) need to be accounted for to achieve a good baseline image. One example of these effects which is important to the subsequent processing is brightness normalization. Specific preprocessing for segmentation, plate tilt detection (block 16) and license plate position refinement (block 18) are given as follows.

In block 16, plate tilt or skew is detected and accounted for. Plate tilt or skew has a detrimental effect on character segmentation. Detecting the tilt of a license plate image and correcting it, improves the accuracy of segmentation and recognition. For estimating the license plate tilt, its accuracy is dependent on selecting features within the plate image.

Tilt detection algorithms for license plates of the prior art are based on local minima and local maxima pixels extracted from character regions. An analysis of the spread distance of the feature pixels through a set of orthogonal projections determines a possible tilt angle. However, the accuracy is subject to character background. If the plate has dirt, noise or non-uniform illumination, then the undesired feature points can be included and resulting accuracy is not satisfactory. Instead, the present invention employs the use of feature points obtained from the top and bottom edges of characters together with a plate border, which is parallel in the horizontal dimension.

An edge detector is applied to identify all of the character edges and plate edges in the horizontal direction. The dominant points from edges are then selected by using an adaptive threshold based on mean and standard deviation. For example, given an angle of θ degrees rotated with respect to center position of the image, a vertical projection of the points obtained in the previous step is computed, yielding a one-dimensional projection array P(θ). Using a bin size with one pixel unit at the sampled resolution due to the small angle rotation, the tilt angle is determined as follows. For each projection direction, a cost function, C(θ), the sum of square of the accumulated values of each bin, is calculated. Therefore, C(θ) is obtained as:

$$C(\theta) = \sum_{i=1}^{n} P_i^2(\theta) \qquad (1)$$

where $P_i(\theta)$ is the value of the i-th bin found for angle θ, and n is the number of bins. The angle that gives the maximum C(θ) corresponds to the correct tilt angle. In fact, due to one degree resolution of the projection, the maximum C(θ) can be further interpolated through a quadratic fitting function to improve the accuracy. In one embodiment, computation time is reduced by limiting an estimated angle range. The estimate angle range may be limited to within a 10-degree inclination so that an exhaustive search can still perform well without degrading speed. If the plate is tilted by a large angle an exhaustive search could be time-consuming, a coarse-to-fine search (such as binary or Fibonacci search) can be useful to reduce the amount of searching needed to find a maximum. Nonlinear least-squares methods may also be employed. The tilt angle is accounted to aid in plate character recognition.

Figure 2:
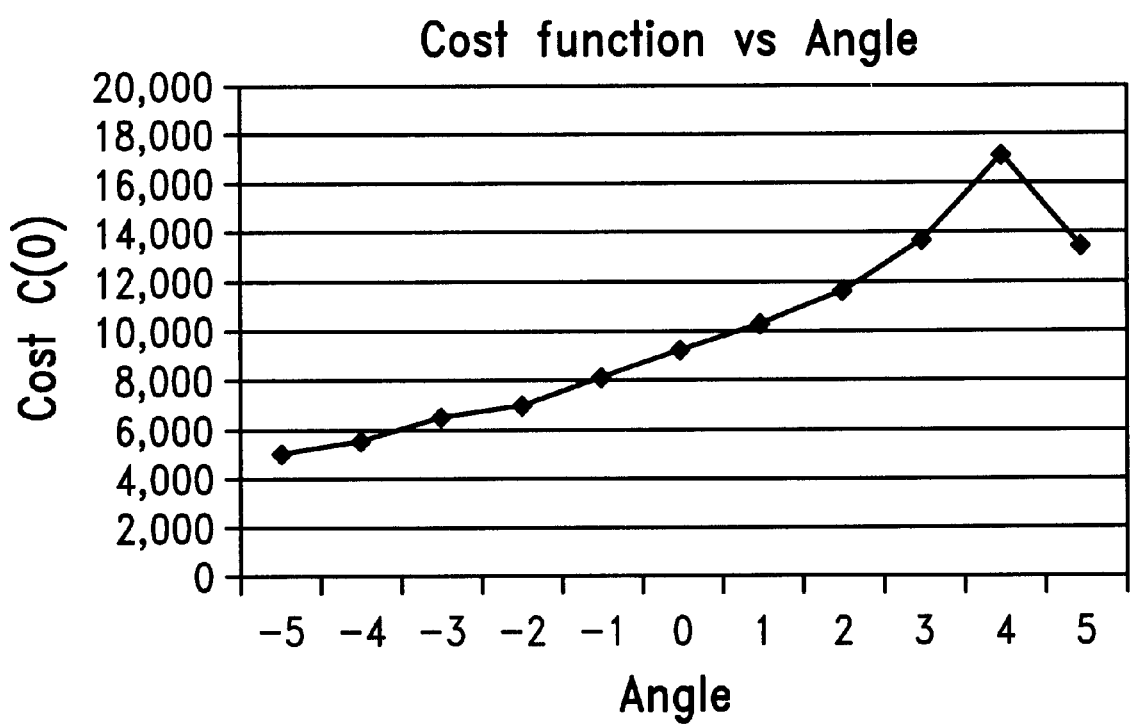
FIG. 2 is a plot of cost versus tilt angle for determining a tilt angle for license plates in accordance with the present invention.

Referring to FIG. 2, a plot of cost function C(θ) (cost) is plotted against an angle of rotation or tilt angle. A license plate to be recognized, in this example, is tilted by an angle with respect to the horizontal axis. The plot determines that a tilt angle of about 4 degrees is present in the input image of the license plate (e.g., highest cost). This angle is then corrected to give an image with a rotation angle of about zero degrees by adjusting the image of the license plate.

In block 18, plate position refinement is performed. The output image from license plate localization (block 11) usually gives a wider area that includes not only the plate characters but also the plate frame and possibly the body of the vehicle. It is necessary to perform a refined localization that leaves out unnecessary regions but retains plate characters. The present invention performs the refinement of plate position into vertical and horizontal dimensions by considering features such as plate border, plate background and plate characters.

In general, the best feature to facilitate position refinement is the presence of the plate border on the image where it forms a rectangle shape and surrounds with the textural region. By detecting vertical and horizontal edges and searching the maximum length of the edges from each side, the refinement can be performed accurately. However, for some license plates if one or more plate edges cannot be detected due to a homogeneous background with a vehicle body, then significant error can result. In these cases, features of plate characters, that is, height and width are measured.

The present invention estimates the character height in the corrected tilt image. A signature of a stroke transition number is employed as a measurement feature corresponding to character existence. Assuming that a plate candidate region has the dimension (pixels) M×N, the projection function S(j) is defined with the summation of all character signatures in the row:

$$S(j) = \sum_{i=0}^{M-1} r(i, j), \quad 0 \le j \le N-1 \qquad (2)$$

where r(i,j) is the number of transitions (object-background or background-object) on the pixel (i,j). This feature is computed on the binarized image of the plate candidate, i.e., where the suspected license plate image is located. The binarization is preferably based on a local mean and a local standard deviation over the image. The threshold at pixel (i,j) is calculated as:

$$T(i,j) = m(i,j) + k \cdot d(i,j) \qquad (3)$$

where m(i,j) and d(i,j) are the sample mean and standard deviation values in a local neighborhood of (i,j) respectively. In a preferred embodiment, a 16×16 neighborhood is to preserve local details and minimize noise effects. The value of k is used to adjust how much of the character boundary is taken as a part of the given image. For example, k=−0.2 to give well-separated print characters. It should be noted that a constant k may result in width variation between characters due to non-uniform illumination. The effect of k corresponding to a recognition result will be illustrated below. Statistically, the average transition number per row of textural region is much higher than that of non-textural regions. If S(j) is segmented properly, the result of maximum spread distance will correspond to character heights.

Figure 3:
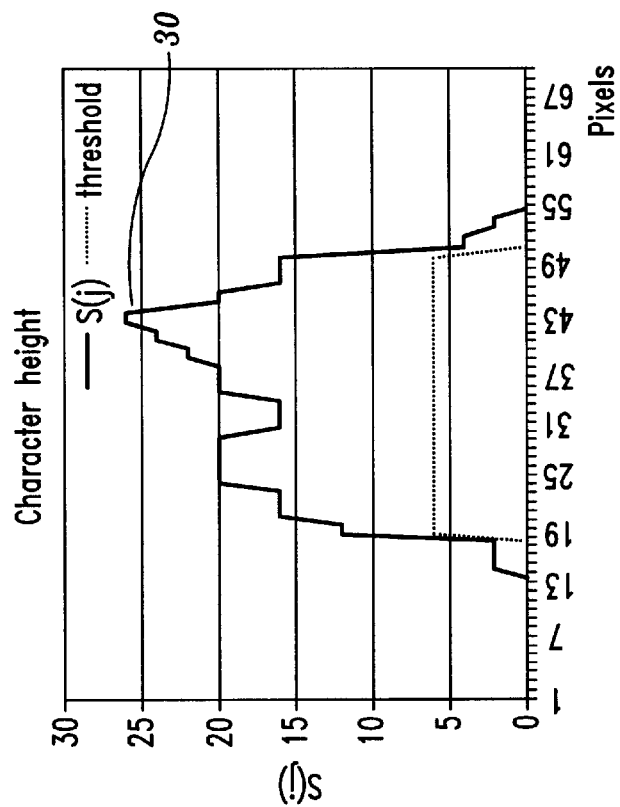
FIG. 3 is a plot of S(j) versus pixels for determining character height for license plate characters in accordance with the present invention.

Referring to FIG. 3, a projection function S(j) is shown where the height of the characters is the distance from the values of S(j) above a threshold. The threshold of S(j) is obtained adaptively based on a mean value and a standard deviation of S(j). Once the height of characters is determined, the region of interest in the vertical dimension is further extracted.

The width of plate numbers may be estimated based on prior knowledge of the ratio of plate width to plate height, and only the central position of plate number in the horizontal axis needs to be determined. A spatial variance method may be implemented to estimate this position. If the spatial variance is computed along a line of the license plate (e.g., horizontal), regions with high spatial variance correspond to text regions, and the regions with low spatial variance correspond to non-text regions. Thus, the position associated with the highest variance can be selected as the center position of the plate number on the horizontal axis.

Figure 4:
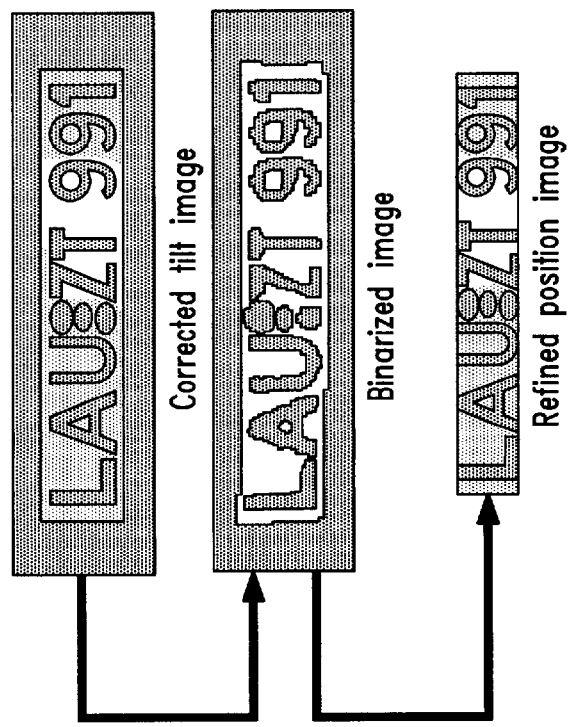
FIG. 4 is a block diagram showing different stages of plate position refinement in accordance with the present invention.

With the analysis of plate edges, the accuracy of refinement can be improved and spurious detection can be eliminated. After refinement is performed along the horizontal axis, the region of interest is extracted again then resampled to a fixed resolution for the subsequent segmentation and classification. FIG. 4 shows the result for plate position refinement at different stages of the process.

In block 20, character segmentation is performed. This includes identifying characters in the license plate by separating images of the characters for recognition. (See also block 110 of FIG. 7). In accordance with the invention, block 22 employs recognition-based segmentation. In block 22, segmentation of touching/overlapping characters is performed, if needed. Solving the segmentation of touching characters is of importance to any optical character recognition (OCR) applications. Several techniques have been developed in the prior art which suffer an inability to discriminate between kerned characters (i.e. the characters who overlap with neighboring characters) or characters which touch adjacent characters.

Figure 5A:
FIG. 5A depicts pixels for overlapped characters to be segmented in accordance with the present invention.
Figure 6A:
FIG. 6A depicts pixels for touching characters to be segmented in accordance with the present invention.
Figure 5B:
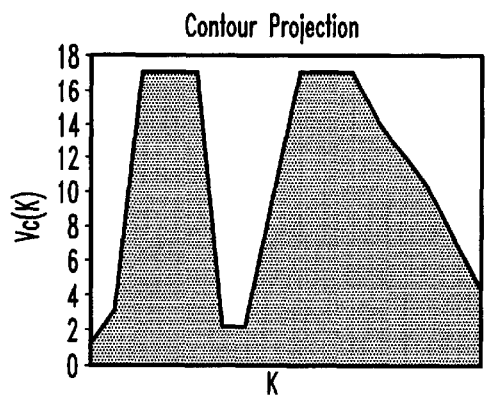
FIG. 5B is a contour projection for determining positions of the characters of FIG. 5A to be segmented in accordance with the present invention.
Figure 6B:
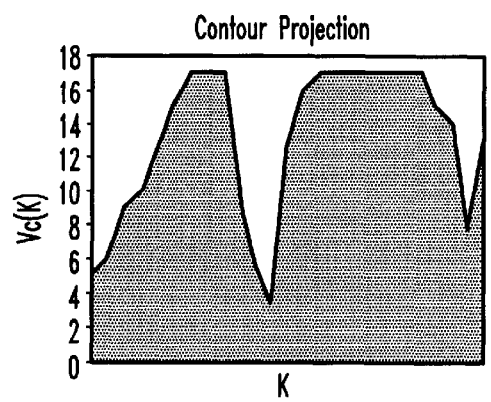
FIG. 6B is a contour projection for determining positions of the characters of FIG. 6A to be segmented in accordance with the present invention.
Figure 5C:
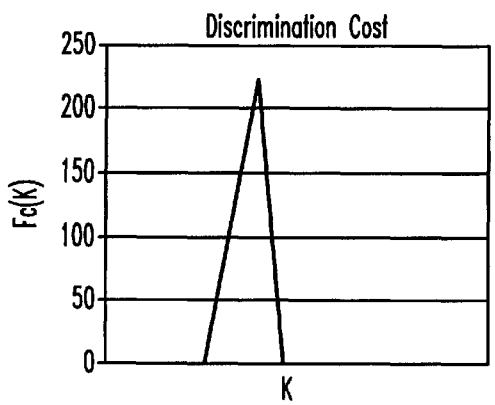
FIG. 5C is a discrimination cost plot for determining a location for segmenting the characters of FIG. 5A in accordance with the present invention.
Figure 6C:
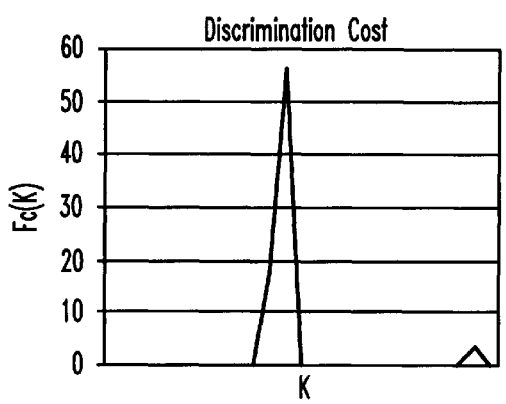
FIG. 6C is a discrimination cost plot for determining a location for segmenting the characters of FIG. 6A in accordance with the present invention.
Figure 5D:
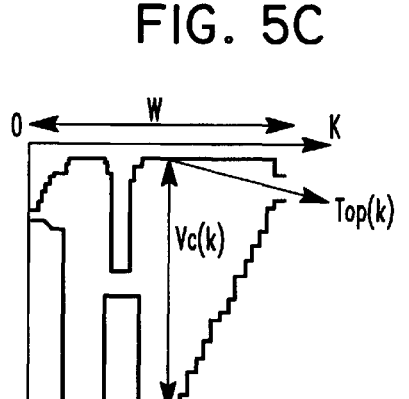
FIG. 5D depicts top and bottom profiles for determining heights of the characters of FIG. 5A to be segmented in accordance with the present invention.
Figure 6D:
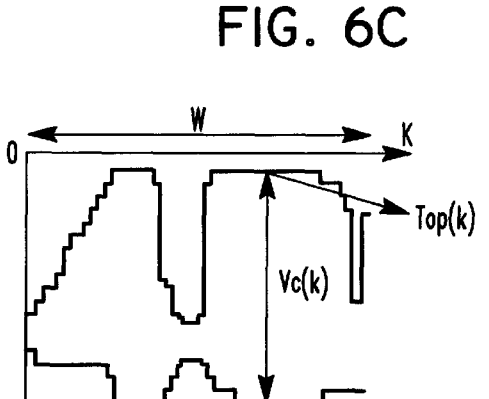
FIG. 6D depicts top and bottom profiles for determining heights of the characters of FIG. 6A to be segmented in accordance with the present invention.

A discrimination function based on contour projection is employed by the invention. Considering a touching character with the width W, a contour projection function $V_c(k)$ is defined as:

$$V_c(k) = \text{bottom}(k) - \text{top}(k), \quad k=1,2,3,\ldots,W \quad (4)$$

where the function top(k) gives a top position in the vertical axis as seen from the top profile of the external contour of the touching characters, and the function bottom(k) gives a bottom position in the vertical axis as seen from the bottom profile of the external contour of the touching characters. See FIGS. 5D and 6D for top and bottom profiles for the kerned character "17" in FIG. 5A and the touching characters "48" in FIG. 6A, respectively. Using the above projection function with several adjacent columns, the segmentation discrimination function, $F_c(k)$, is then defined as follows:

$$F_c(k) = \sum_{d=n1}^{n2} \left[ \frac{V_c(k+d) - 2V_c(k) + V_c(k-d)}{V_c(k)} \right]^2, \quad d < k < W-d \quad (5)$$

where d is an offset from a current character position to adjacent character positions. The summation interval from n1 to n2 denotes all possible offsets determined empirically based on the size of the characters and the overlapped condition in the text. Given the robustness for the present invention, n1=1 and n2=2 was found to result in a good discrimination capability. Other values for n1 and n2 are also contemplated. FIGS. 5B and 6B show contour projections $V_c(k)$ as a function of k for FIGS. 5A and 6A, respectively. FIGS. 5C and 6C illustrate the values of the discrimination function, $F_c(k)$ as a function of k. Each offset d contributes to the values of the discrimination function with significant increases near the touching point of the characters. Using a suitable threshold, candidate-cutting points are selected for locations at which to split the image. It should be noted that the proposed contour projection is only applied for suspicious characters that failed during classification. It is redundant to check those segmented characters if they can be recognized with a good confidence measure. In addition, the proposed contour projection may be combined with pixel projection for identifying touching characters that mix with lower case characters in machine-printed documents.

Recognition-based segmentation of block 22 is performed in accordance with the present invention. The recognition-based segmentation searches the image for character components that match classes in its alphabet. Recognition compares templates or employs a statistical classifier to identify characters and return a confidence score based on a probability that the character has been properly identified.

The principle of operation of the present invention is quite different from open-loop segmentations based on distinguishing boundaries in all fonts from interior regions, but closely coupled with character recognition. Recognition-base segmentations of the prior art use a sliding window of variable width to provide sequences of candidate segmentations that are confirmed by character recognition. The input image can generate multiple sequences by varying the window placement and size. The best sequence associated with the highest confidence measure is chosen as a segmentation result. However, the problem with the prior art methods is that it is difficult to choose a suitable window on the initial trial, particularly for proportionally spaced characters. Tsujimoto and Asada, in "Resolving ambiguity in segmenting touching characters", *The First International Conference on Document Analysis and Recognition*, pp. 701–709, October 1991, developed a recursive segmentation-and-recognition algorithm for segmenting touching characters. They introduced a break cost function that finds tentative break positions, and then confirms these break positions through searching a decision tree constructed by recognition results. Unfortunately, their work could be computationally intensive if more break positions are involved for building a decision tree.

Referring to FIG. 7, in accordance with the invention, a conditionally recursive segmentation method that implements a forward split and backward merge procedure and is based on the output of recognition is shown. In block 100, segmentation preprocessing is performed on an image for example a license plate image as described above. In block 110, initial segmentation is performed. The input image is segmented into regions based on vertical projection that can eliminate many possible errors for the initial trial. As a deviation from conventional black-pixel projection, the projection function is obtained by selecting the darkest pixel in each column. Vertical projection includes applying a low-pass filter to the projection profile. Then, the distinguished positions between characters are determined through subtraction of original projection function and filtered function. The details are illustrated in commonly assigned U.S. application no. (TBD), entitled "LICENSE PLATE RECOGNITION WITH AN INTELLIGENT CAMERA," previously incorporated herein by reference. The recognition engine is preferably employed as a check. If the segmented image includes a confidence score below a threshold, the process is repeated after suspected characters are split or combined.

After initial segmentation, each resulted region (i.e., suspected or potential character region) can be categorized as either a broken character, a single character, a touching character or an unknown symbol. IF the license plate has a high quality image, almost every segmented region can be classified with a high confidence measure that indicates a recognized character at this stage. However, most license plate images are not in such a condition. If the regions result in unrecognized characters, each of them will be checked by component analysis to filter out small components such as screws or bolts present in the image of the license plate.

Figure 8:
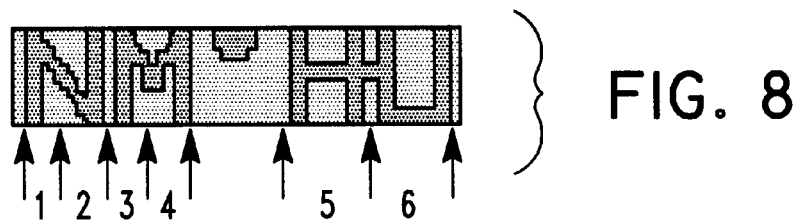
FIG. 8 depicts suspected characters regions as determined by a forward split process in accordance with the present invention.

In block 114, the described discrimination function for separating touching characters is then applied to those over sized regions to see whether they can be further split. It is practical to assume that the associated cost of discrimination function is higher than the defined threshold so that unnecessary splitting can be avoided. The forward split procedure of block 114 is immediately followed by recursive recognition which returns to block 114 until no break point is found in suspicious regions where a low confidence score is obtained for recognizing the character in question. An example is shown in FIG. 8 wherein six character regions (1–6), as indicated between arrows, denote positions at which to split the character image.

Figure 9:
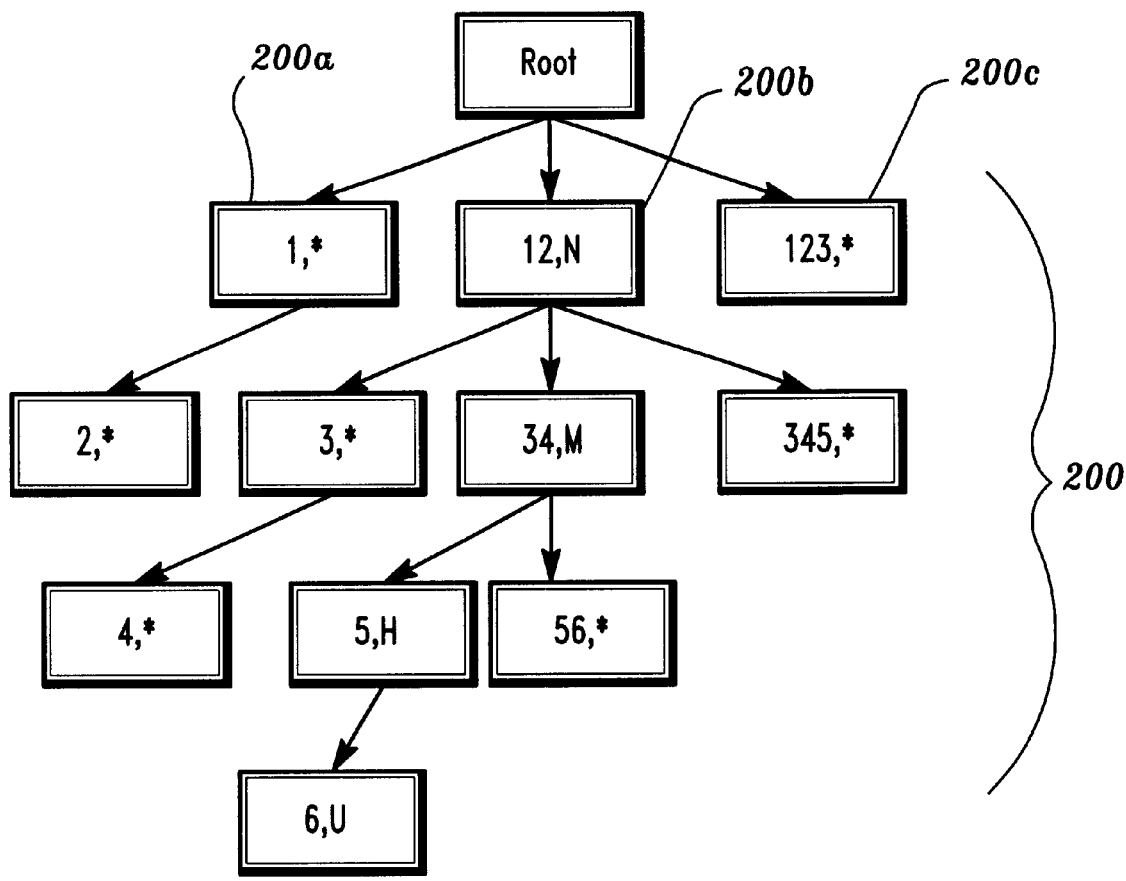
FIG. 9 is a decision tree employed in performed a backward merge in accordance with the present invention.

In block 116, a backward merge process is performed to evaluate regions in the image to determine if a higher confidence is achievable by combining regions. This is a recursive recognition process as indicated by the feedback loop in FIG. 7. Referring to FIG. 9, each node 200 for each suspected character region 1–6 (see FIG. 8) might form an actual character depending on the recognition of the region. When a node can be classified with a significant confidence measure, the result is stored in the relevant node. Then, the subsequent nodes that are the possible combinations of the remaining regions are processed. Nodes that give poor recognition are not evaluated further (e.g., nodes with * in FIG. 8). Each subsequent evaluation is constrained to only the neighborhood in the region in question and its 2 contiguous adjacent nodes. This reduces computational time. The tree is constructed until no regions are left. The most likely path through the tree will be selected as the correct segmentation, and the corresponding recognition will be immediately available. If none of the paths result in a good recognition, the less likely branches can be evaluated. For example, considering FIG. 8, region 1 is determined in node 200a not to include a recognized character (an * is placed in the node). The process then considers regions 1 and 2 in node 200b. An "N" is recognized with sufficient confidence. In node 200c, regions 1, 2 and 3 are checked, but the evaluation does not yield results with a sufficient confidence level. Processing continues as shown.

In block 115, character recognition is performed in accordance with the present invention. Character recognition may be performed in a plurality of different ways. In particularly useful embodiments, a neural network, template matching or a combination of both may be employed. Template matching will now be described in greater detail. Neural network implementation is described in greater detail in U.S. application no. (TBD), "LICENSE PLATE RECOGNITION WITH AN INTELLIGENT CAMERA", previously incorporated herein by reference.

The segmentation method of the present invention depends for its accuracy on the character recognition method that is applied to the split regions. It is independent of that algorithm in the sense that any recognition methods may be employed with the segmentation. Therefore, in addition to neural network serving as an OCR engine, the present invention implements template matching to further facilitate the recognition task. Template matching applies to segmented regions enclosed by rectangles with connected components in the regions having an average size. Further, the regions (with a character or portion thereof) are recognized by the neural network with a lower confidence measure (below a threshold). In such case, the region of interest is first binarized and scaled to the same size of the templates in a database, for example, 15×25 or 20×30 pixels. A normalized matching index with the range of −1 and 1 is defined as the confidence measure obtained by pixel-to-pixel comparison between the saved symbol image and the input object image. As the confidence measure approaches 1, the saved images (virtual samples) associated with character symbols are classified, which implies a perfect match (confidence of 1) that the class of the input image is the same as that of the saved one, and vice versa. A threshold of about 0.5 may be chosen to filter out non-match characters. The threshold may be adjusted according to the application. Template matching provides for an exhaustive search in a stored database including a variety of symbol images, including different sizes and styles of the same character, various illumination effects, shadows, blurred images, etc.

In the matching process, it should be noted that background pixels that match are usually not counted, since that strongly biases the matching index. However, if a hole is considered as a structure, the set of background pixels in the hole is permitted as a character. To do this, the holes are marked with a pixel value other than those used for background and object pixels. Then, an extra case (i.e., hole pixels) is combined for the matching. In essence, hole pixels are treated in the same way as object pixels, but are a distinct class and do not match with an object pixel.

Figure 10A:
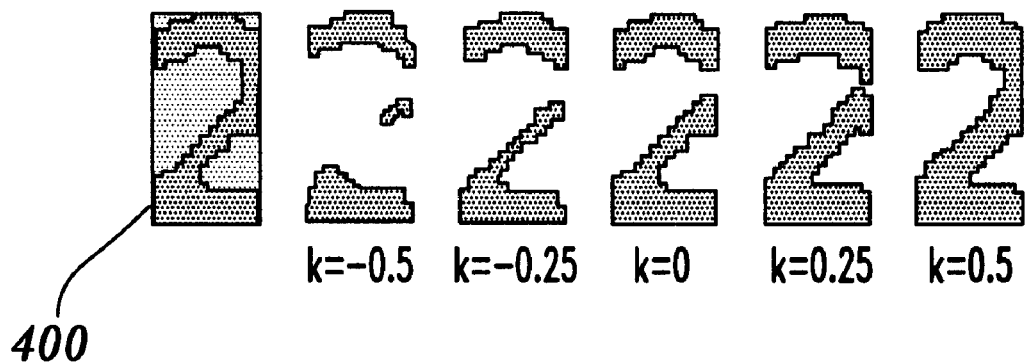
FIGS. 10A and 10B show examples of varying k, a constant for adjusting character boundaries, used in providing a higher confidence score in character recognition.
Figure 10B:
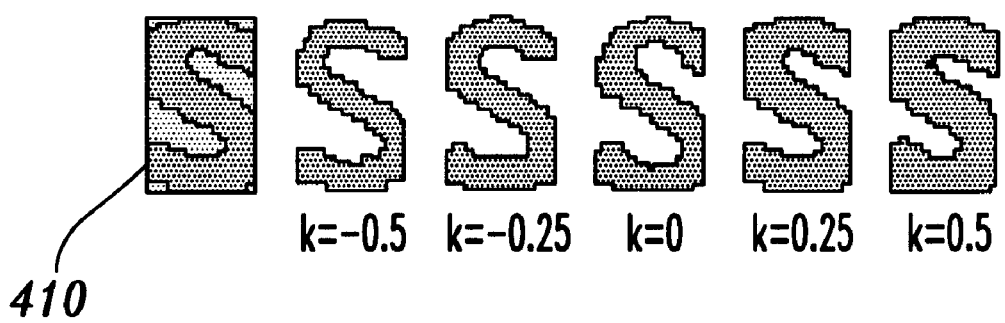

Niblack's method maybe adapted for binarization of images based on the local mean and local standard deviation over the image. (See e.g., O. D. Trier, et al., "Goal-directed evaluation of binarization methods", IEEE Transaction on Pattern Analysis and Machine Intelligence, Vol. 17, No. 12, pp. 1191–1201, December 1995). In Eq. 3, the value of k is used to adjust how much of the character boundary is taken as a part of the given image. As image environment changes, character widths are likely to be varied to different levels. A constant k may not be suitable to give a good matching. Therefore, a multi-threshold is derived based on the variation of k. In one embodiment, if k is incremented from −0.5 to 0.5 at an interval of 0.25 a good selection that covers a large variation in symbols of the data set. FIGS. 10A and 10B show how different thresholds affect character boundary. Image 400 and 410 are the image to be matched. By varying k a better match may be obtained for each image. Image 400 has a highest confidence when k=0.5 in FIG. 10A, and image 410 has a highest confidence when k=0.0 in FIG. 10B.

Experiments were carried out by the inventors in accordance with the present invention employing an intelligent camera, as described in U.S. application no. (TBD), "LICENSE PLATE RECOGNITION WITH AN INTELLIGENT CAMERA", previously incorporated herein by reference. The system performance was based on overall recognition rate of entire license plates under varying distances and illumination effects. Illumination changes were performed by varying the lens aperture with f number 2, 2.4, and 4. It should be noted that the recognition rate defined here is in terms of number of license plates rather than number of characters.

A closed-loop of the recognition and segmentation stage increases the robustness for the effects of environmental changes. Although the present invention is demonstrated using German license plates, the algorithms are general and extensible for different nationalities of license plate as well as to other character recognition tasks.

In the automated license plate recognition system many reading errors are caused by inadequate character segmentation. In particular, character segmentation becomes difficult as the acquired vehicle images are seriously degraded. The present invention utilizes computer vision techniques and proposes a recognition-based segmentation method coupled with template matching and a neural network. This enhances the accuracy of the recognition system that aims to automatically read license plates. Algorithmic improvements for a projection-based segmentation are described here. In the preprocessing stage, plate skew detection and position refinement methods are developed to prepare the data for later process. For separating touching characters a discrimination function is presented based on a differential analysis of character contour distance. A conditionally recursive segmentation with the feedback of recognition is developed for effectively splitting touching characters and merging broken characters.

Having described preferred embodiments for character segmentation method for vehicle license plate recognition (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for segmenting and recognizing license plates comprising the steps of:

capturing an image of a license plate;

preprocessing the image to prepare the image for segmentation and recognition;

forward splitting regions of the license plate image into suspected characters regions;

recognizing suspected character regions in the license plate image and providing a confidence score based on a probability of a correct match;

if the suspected characters have a confidence score below a threshold value, backward merging adjacent suspected character regions;

recognizing the backward merged suspected character regions in the license plate; and if the backward merged suspected character regions have a confidence score below the threshold value, repeating the backward merging and recognizing steps.

2. The method as recited in claim 1, wherein the step of recognizing suspected character regions in the license plate image includes determining regions with a confidence score below a threshold, and the step of forward splitting regions includes the step of segmenting touching or overlapping characters in adjacent suspected character regions by employing a discrimination function based on contour projections of the characters.

3. The method as recited in claim 2, wherein the step of segmenting touching or overlapping characters is recursively applied to achieve the threshold value of a confidence score.

4. The method as recited in claim 1, wherein the step of recognizing suspected character regions in the license plate image and providing a confidence score based on a probability of a correct match includes the step of recognizing characters in the license plate image by employing at least one of a neural network and template matching.

5. The method as recited in claim 1, wherein the step of recognizing the backward merged suspected character regions in the license plate includes the step of recognizing characters in the license plate image by employing at least one of a neural network and template matching.

6. The method as recited in claim 1, wherein the step of preprocessing the image to prepare the image for segmentation and recognition includes the steps of:

detecting pretilt in the license plate image by detecting edges and selecting feature points to determine a projection array on the edges;

selecting the projection array having a highest cost to determine an angle of rotation; and correcting the license plate image in accordance with the angle of rotation.

7. The method as recited in claim 1, wherein the step of preprocessing the image to prepare the image for segmentation and recognition includes the steps of:

refining a position of the license plate by:

determining a height of characters on the license plate image by employing a projection function;

computing a spatial variance to determine a center position of the characters;

employing the center position and the height of the characters to reduce a size of a region of interest by detecting edges of a plate border and computing a length of the edges to identify the region of interest.

8. The method as recited in claim 1, wherein the step of preprocessing the image to prepare the image for segmentation and recognition includes the steps of providing a projection profile of pixel intensities across vertical lines of pixels in the image;

filtering the projection profile; and identifying locations of characters in the image depicted by area below a threshold value in the filtered projection profile.

9. The method as recited in claim 1, further comprising the step of outputting recognized characters of the license plate image.

10. The method as recited in claim 1, further comprising the step of comparing recognized characters and character blocks to predetermined license plate codes and conventions to check accuracy of recognition.

11. A method for segmenting and recognizing license plates comprising the steps of:

capturing an image of a license plate;

preprocessing the image to prepare the image for segmentation and recognition;

forward splitting regions of the license plate image into suspected characters regions by segmenting touching or overlapping characters in adjacent suspected character regions by employing a discrimination function based on contour projections of the characters, when the suspected characters have a confidence score below a threshold value;

recognizing suspected character regions in the license plate image and providing a confidence score based on a probability of a correct match;

if the suspected characters have a confidence score below a threshold value other than due to touching or overlapping characters, backward merging adjacent suspected character regions;

recognizing the backward merged suspected character regions in the license plate;

if the backward merged suspected character regions have a confidence score below the threshold value, repeating the backward merging and recognizing steps;

comparing recognized characters and character blocks to predetermined license plate codes and conventions to check accuracy of recognition; and outputting recognized characters of the license plate image.

12. The method as recited in claim 11, wherein the step of segmenting touching or overlapping characters is recursively applied to achieve the threshold value of a confidence score.

13. The method as recited in claim 11, wherein the step of recognizing suspected character regions in the license plate image and providing a confidence score based on a probability of a correct match includes the step of recognizing characters in the license plate image by employing at least one of a neural network and template matching.

14. The method as recited in claim 11, wherein the step of recognizing the backward merged suspected character regions in the license plate includes the step of recognizing characters in the license plate image by employing at least one of a neural network and template matching.

15. The method as recited in claim 11, wherein the step of preprocessing the image to prepare the image for segmentation and recognition includes the steps of:

detecting pretilt in the license plate image by detecting edges and selecting feature points to determine a projection array on the edges;

selecting the projection array having a highest cost to determine an angle of rotation; and correcting the license plate image in accordance with the angle of rotation.

16. The method as recited in claim 11, wherein the step of preprocessing the image to prepare the image for segmentation and recognition includes the steps of:

refining a position of the license plate by:
determining a height of characters on the license plate image by employing a projection function;
computing a spatial variance to determine a center position of the characters;
employing the center position and the height of the characters to reduce a size of a region of interest by detecting edges of a plate border and computing a length of the edges to identify the region of interest.

17. The method as recited in claim 11, wherein the step of preprocessing the image to prepare the image for segmentation and recognition includes the steps of providing a projection profile of pixel intensities across vertical lines of pixels in the image;

filtering the projection profile; and identifying locations of characters in the image depicted by area below a threshold value in the filtered projection profile.

18. A program storage device readable by machine, tangibly embodying a program of instructions executable by the machine to perform method steps for segmenting and recognizing license plates, the method steps comprising:

capturing an image of a license plate;

preprocessing the image to prepare the image for segmentation and recognition;

forward splitting regions of the license plate image into suspected characters regions;

recognizing suspected character regions in the license plate image and providing a confidence score based on a probability of a correct match;

if the suspected characters have a confidence score below a threshold value, backward merging adjacent suspected character regions;

recognizing the backward merged suspected character regions in the license plate; and if the backward merged suspected character regions have a confidence score below the threshold value, repeating the backward merging and recognizing steps.

19. The program storage device as recited in claim 18, wherein the step of recognizing suspected character regions in the license plate image includes determining regions with a confidence score below a threshold, and the step of forward splitting regions includes the step of segmenting touching or overlapping characters in adjacent suspected character regions by employing a discrimination function based on contour projections of the characters.

20. The program storage device as recited in claim 19, wherein the step of segmenting touching or overlapping characters is recursively applied to achieve the threshold value of a confidence score.

21. The program storage device as recited in claim 18, wherein the step of recognizing suspected character regions in the license plate image and providing a confidence score based on a probability of a correct match includes the step of recognizing characters in the license plate image by employing at least one of a neural network and template matching.

22. The program storage device as recited in claim 18, wherein the step of recognizing the backward merged suspected character regions in the license plate includes the step of recognizing characters in the license plate image by employing at least one of a neural network and template matching.

23. The program storage device as recited in claim 18, wherein the step of preprocessing the image to prepare the image for segmentation and recognition includes the steps of:

detecting pretilt in the license plate image by detecting edges and selecting feature points to determine a projection array on the edges;

selecting the projection array having a highest cost to determine an angle of rotation; and correcting the license plate image in accordance with the angle of rotation.

24. The program storage device as recited in claim 18, wherein the step of preprocessing the image to prepare the image for segmentation and recognition includes the steps of:

refining a position of the license plate by:
determining a height of characters on the license plate image by employing a projection function;
computing a spatial variance to determine a center position of the characters;
employing the center position and the height of the characters to reduce a size of a region of interest.

25. The program storage device as recited in claim 18, wherein the step of preprocessing the image to prepare the image for segmentation and recognition includes the steps of providing a projection profile of pixel intensities across vertical lines of pixels in the image;

filtering the projection profile; and identifying locations of characters in the image depicted by area below a threshold value in the filtered projection profile.

26. The program storage device as recited in claim 18, further comprising the step of outputting recognized characters of the license plate image.

27. The program storage device as recited in claim 18, further comprising the step of comparing recognized characters and character blocks to predetermined license plate codes and conventions to check accuracy of recognition.

* * * * *